Patented Sept. 2, 1941

2,254,633

UNITED STATES PATENT OFFICE 2,254,633

GLASS COMPOSITION AND PRODUCTS THEREOF

Edgar D. Tillyer and Harold R. Moulton, Southbridge, and Townsend M. Gunn, Attleboro, Mass., assignors to American Optical Company, Southbridge, Mass., a voluntary association of Massachusetts No Drawing. Application May 26, 1939, Serial No. 275,958

5 Claims. (Cl. 106—36.1)

This invention relates to a novel vitreous or glass composition and method of making the same and also to articles of said composition.

A principal object of the invention is to provide a vitreous or glass composition and method of making the same having the properties of high index of refraction, high reciprocal relative dispersion, low fusing point, freedom from color, and possessing characteristics particularly adaptable to forming optical products.

This application is a continuation in part of our application Serial Number 93,656, filed July 31, 1936.

Another object is to provide a vitreous or glass composition having the above characteristics which will be relatively stable to "weathering."

Another object is to provide a stabilized zinc borate glass composition and/or lenses of said composition.

Other objects and advantages of the invention will become apparent from the following description and it will be seen that many changes may be made in the arrangements of ingredients and methods described without departing from the spirit of the invention as expressed in the accompanying claims. We, therefore, do not wish to be limited to the exact details and methods described, as the preferred forms only have been set forth by way of illustration.

Glasses having relatively high index of refraction and high reciprocal relative dispersion, with low fusing point, have been known in the past, but such glasses in most instances have been unstable as to "weathering," corrosion, etc., and were not of a desirable commercial nature, particularly for use in forming ophthalmic lenses.

It, therefore, is one of the primary objects of this invention to provide glass composition and method of making the same having the desired properties of high index of refraction, high reciprocal relative dispersion, and low fusing point, and which will be stable to "weathering" and corrosion and desirable for use in forming ophthalmic lenses.

The composition, or product thereof, embodying the invention comprises preferably the following ingredients:

| | Per cent |
|---|---|
| ZnO | 40 to 60 |
| $B_2O_3$ | 40 to 60 |
| $BeCO_3$ | 5 to 20 |

If desired all or part of the $BeCO_3$ may be replaced by $Al_2O_3$ to modify the coefficient of thermal expansion, to change the partial dispersion, and to modify the stability under certain conditions. It will be understood that other beryllium or aluminum compounds may be selected from a group consisting of $BeSO_4$, $Be(OH)_2$, $BeSiO_3$, $Al_2O_3$, $BeO$, $Al(OH)_3$, $AlPO_4$, etc.

The foregoing composition will be more transparent than ordinary glass of the same index to light of low wave length and articles formed thereof will therefore possess this desirable feature as well as those set forth above as regards resistance to corrosion and "weathering."

It has been found that a more colorless transparent glass can be made by incorporation of the stabilizing ingredients in metallic form preferably mixed with the batch. This is due to the reducing action of these metals on traces of impurities which may be present more specifically iron. It, therefore, is to be understood that this incorporation of stabilizing ingredients in metallic form is a feature of this invention.

It is to be understood that all percentages of the various ingredients used are figured on the basis of the complete batch.

It is also to be understood that if desired a composition having the above characteristics may have incorporated in it, elements producing absorption in the visible or invisible regions of the spectrum. Such elements, for example, might be as follows:

Cerium compounds to produce absorption beginning in the near ultra violet.

Ferrous iron to give pronounced absorption in the infra-red, or compounds incorporating both of the above ingredients, might be used to give a sharp cut-off at either end of the visible spectrum. Other well known coloring oxides, such as cobalt, manganese, nickel, etc. may be also added for producing selected absorptions in the visible region of the spectrum.

The compositions produced by the above formulae are preferably used herein as the body portion of ophthalmic lenses. The required finished optical surfaces of the lenses are generated on the body portion by abrading tools and machines such as are commonly used in the art and are carefully formed to the prescriptive requirements of the wearer. Lenses formed in the above manner, due to the stability of the glass, will be much clearer and durable as to "weathering" and corrosion.

From the foregoing description it will be seen that novel means and method have been provided for obtaining a high index, high reciprocal relative dispersion vitreous composition, or product thereof, having a relatively low fusing point and which will be more stable to "weathering," corrosion, etc.

Such a high index, high reciprocal relative dispersion vitreous composition when matched with lower or higher index glasses of suitable partial dispersions may also be used to form lens systems suitable for microscopy, photography, etc. This was not practical in the past because of the lack of stability of the available glasses of proper optical properties.

The glass analyses given in the following claims are expressed as oxides as is customary. It is to be understood that these analyses are to include the use of other equivalent chemical expressions of the elements which are familiar to those skilled in the art as for example ZnO might be expressed as $Zn(CO_3)_2$, $Zn(NO_3)_2$, etc. The analyses given in the claims, therefore, are intended to cover all of such equivalent chemical expressions.

Having described our invention, we claim:

1. A vitreous composition whose analysis is expressed as:

| | Per cent |
|---|---|
| Zinc oxide | 40 to 60 |
| Boric anhydride | 40 to 60 | and a stabilizer introducing from 0.5 to 2.5% beryllium, based on the batch.

2. A vitreous composition whose analysis is expressed as:

| | Per cent |
|---|---|
| Zinc oxide | 40 to 60 |
| Boric anhydride | 40 to 60 | and a stabilizer introducing from 2.5 to 10% aluminum, based on the batch.

3. A vitreous composition whose analysis is expressed as:

| | Per cent |
|---|---|
| ZnO | 40 to 60 |
| $B_2O_3$ | 40 to 60 | a compound selected from a group consisting of beryllium compounds and aluminum compounds,

| | Per cent |
|---|---|
| FeO | 0 to 10 |
| $CeO_2$ | 0 to 5 |

4. A vitreous composition whose analysis is expressed as:

| | Per cent |
|---|---|
| Zinc oxide | 40 to 60 |
| Boric anhydride | 40 to 60 | and material selected from a group consisting of beryllium compounds and aluminum compounds and mixtures of said compounds.

5. A lens comprising a body portion formed of a material of a vitreous composition whose analysis is expressed as:

| | Per cent |
|---|---|
| Zinc oxide | 40 to 60 |
| Boric anhydride | 40 to 60 | and from 0.5 to 10% of a material selected from a group consisting of beryllium compounds and aluminum compounds and mixtures of said compounds.

EDGAR D. TILLYER.
HAROLD R. MOULTON.
TOWNSEND M. GUNN.